United States Patent [19]

Dickson

[11] Patent Number: 4,850,788
[45] Date of Patent: Jul. 25, 1989

[54] RAMP ASSEMBLY FOR TRAILERS AND THE LIKE

[75] Inventor: Wayne E. Dickson, Tecumseh, Okla.

[73] Assignee: Dickson Industries, Inc., Tecumseh, Okla.

[21] Appl. No.: 72,760

[22] Filed: Jul. 13, 1987

[51] Int. Cl.$^4$ ............................................. B60P 1/00
[52] U.S. Cl. ...................................... 414/537; 14/71.1
[58] Field of Search ....................... 414/537, 538, 571; 296/61; 14/69.5, 71.1

[56] References Cited

U.S. PATENT DOCUMENTS

| | | | |
|---|---|---|---|
| 1,699,882 | 1/1929 | Ferguson | 414/537 |
| 2,370,427 | 2/1945 | Sherry | 414/537 |
| 3,700,124 | 10/1972 | Lawrence | 414/537 |
| 3,711,882 | 1/1973 | Iller | 414/537 X |
| 3,870,170 | 3/1975 | Noble et al. | 414/537 |
| 3,977,545 | 4/1976 | Lloyd | 414/537 |
| 4,078,678 | 3/1978 | Tordella | 414/537 |
| 4,198,187 | 4/1980 | Mountz | 14/71.1 X |

Primary Examiner—Robert J. Spar
Assistant Examiner—Robert S. Katz
Attorney, Agent, or Firm—Laney, Dougherty, Hessin & Beavers

[57] ABSTRACT

A ramp assembly for trailers which includes a pair of elongated, parallel ramp plates reciprocably supported in tracks under the bed of a trailer. An arresting cam assembly is mounted on the rear of the trailer, and includes a control handle which is connected to, and rotates, a cam rod which carries, and is keyed to, a plurality of spaced cam plates. These cam plates are rotated with the cam rod to bring the lobes of the cam plates against the ramp plates, forcing them into a locked status against the underside of the bed of the trailer. In another rotational position of the cam plates, the ramp plates can be pulled horizontally outwardly from the trailer bed to an inclined loading position, but a cusp on each of the cam plates functions to engage the ramp plates and prevent them from being pulled completely free of the trailer bed.

19 Claims, 2 Drawing Sheets

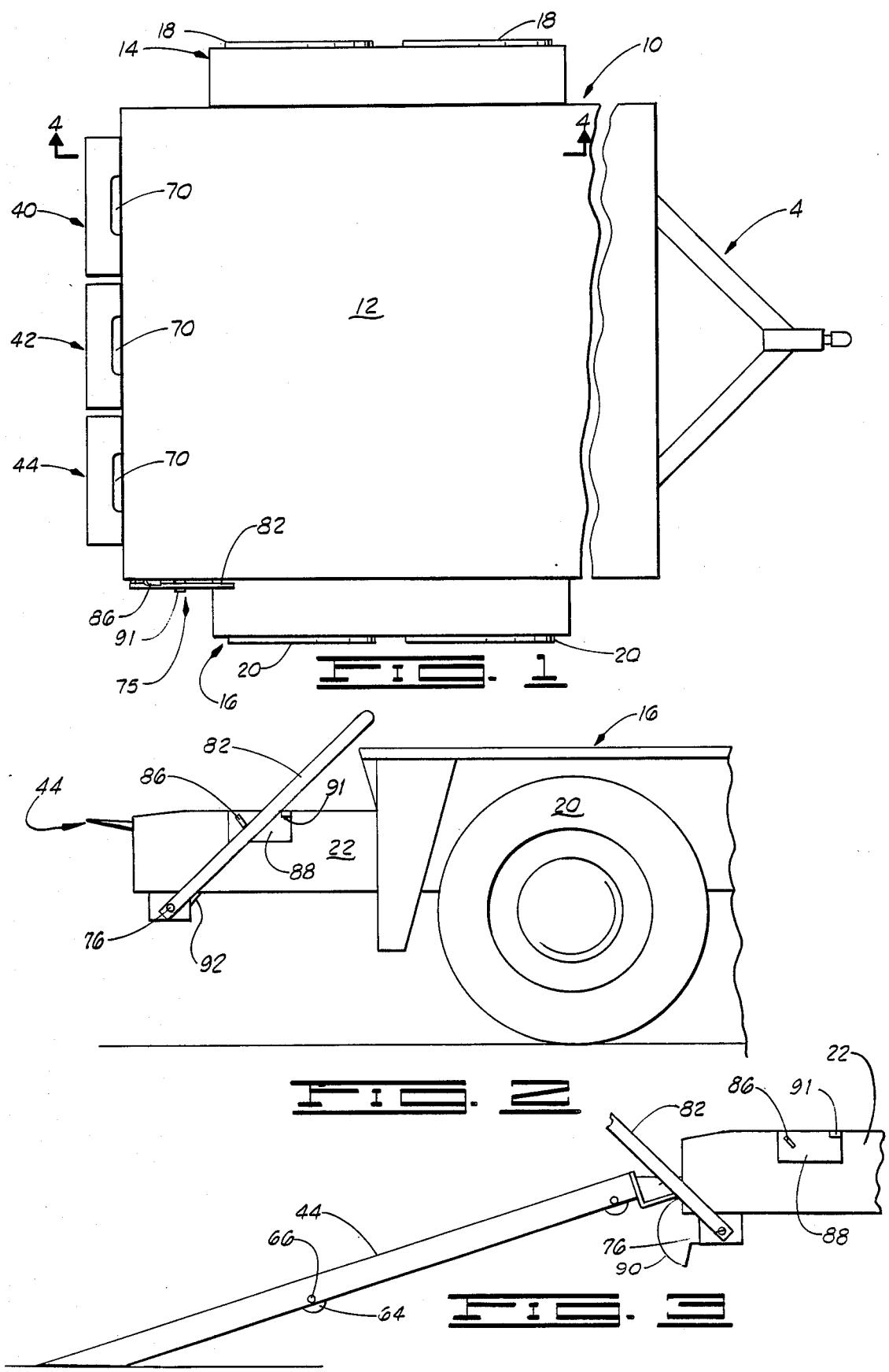

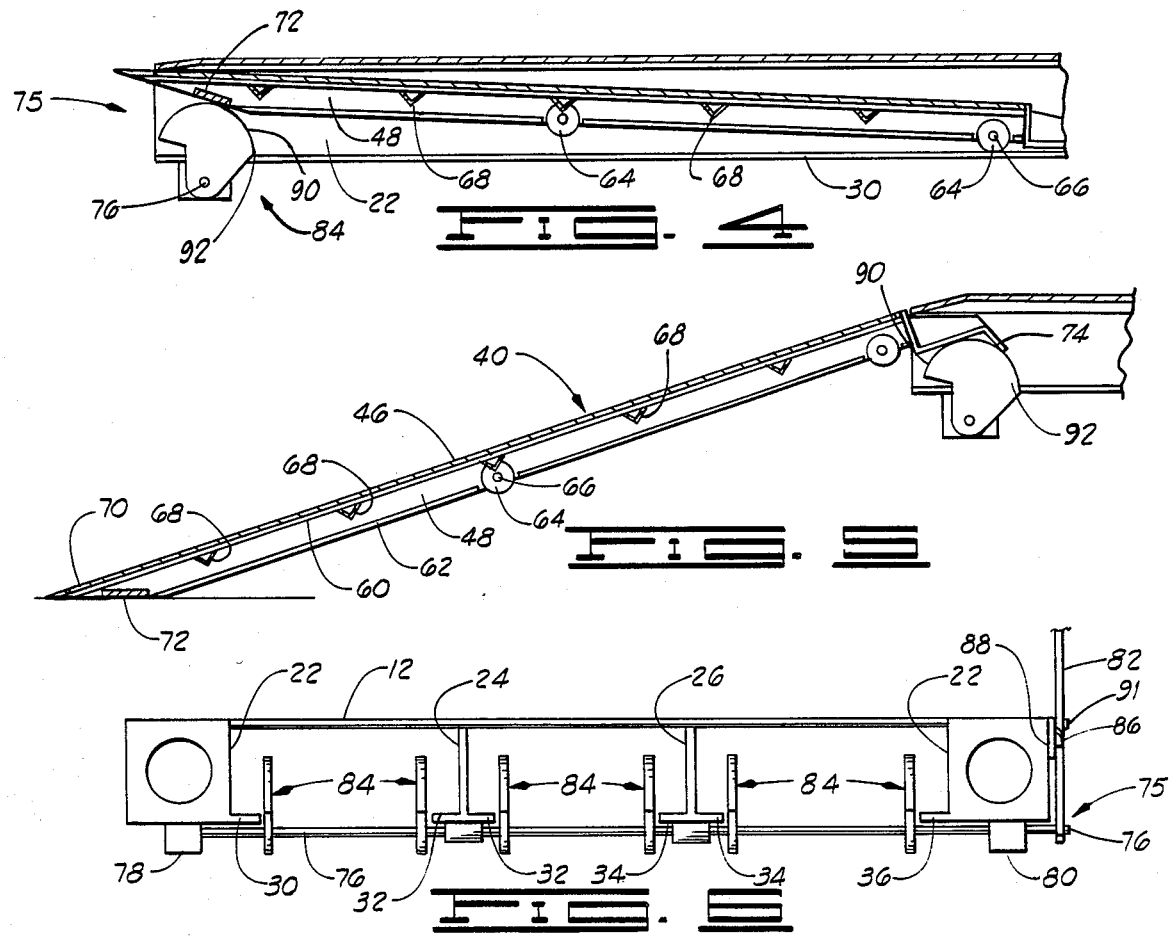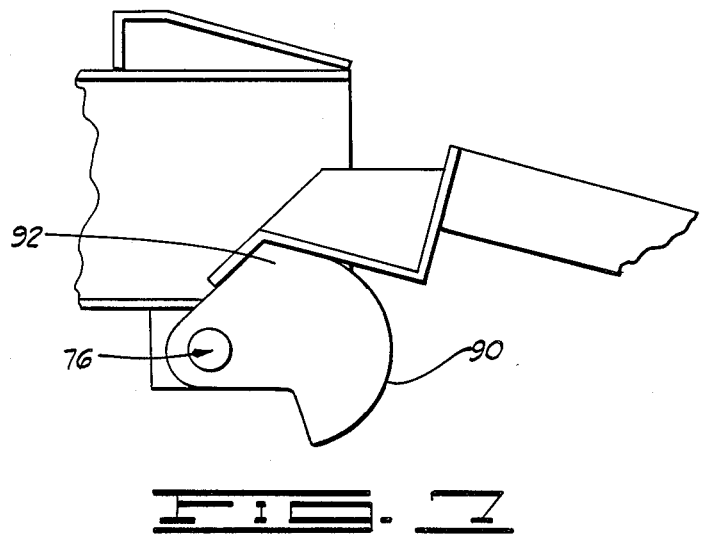

RAMP ASSEMBLY FOR TRAILERS AND THE LIKE

FIELD OF THE INVENTION

This invention relates to a ramp assembly which can be usefully integrated with a trailer, or other cargo-carrying vehicle, which has the cargo loaded thereon by way of an inclined ramp.

BRIEF DESCRIPTION OF THE PRIOR ART

Trailers used for towing agricultural tractors, roadworking implements or the like generally are provided at one end with a towing tongue or hitch connection, and at the opposite or rear end with a ramp assembly by which the load to be transported can be loaded upon the trailer. The ramp assembly employed for this purpose frequently includes a pair of elongated, rigid supporting ramp plates, usually made of steel, and these plates extend from points on the ground spaced rearwardly from the trailer up to the higher level at which the bed of the trailer is located. In the case of a vehicle, such as a farm tractor, which is to be loaded onto the trailer for transport, the ramp plates are spaced in correlation to the spacing of the ground-engaging wheels of the tractor, thus permitting the tractor to be driven up the ramp plates and onto the bed of the trailer.

Ramp plates of the type described are generally stored at some location on the trailer during transport. This may be in a rack beneath the trailer, or alongside the trailer. In one type of construction previously used, the ramp plates are simply pulled from the tracks or guide plates upon which they are supported during transport out to a position where they can be lowered at one end to the ground, and thus placed in the operative position. In this type of construction, there is no positive interlock or adequate engagement to assure that the ramp plates are not vibrated to a loose position during transport, and lost from the trailer.

Another problem occasionally encountered with parallel, elongated ramp plates of the type described is a propensity of the ramp plates to skid or to be displaced horizontally at a time when the plates are first encountered by the wheels of the vehicle to be loaded. If the plates are displaced at this time, the loading can be made much more difficult or even impossible, and an uneven skidding of the plate can even be a cause of accidents due to an overturning of the vehicle being loaded.

GENERAL DESCRIPTION OF THE PRESENT INVENTION

The present invention is an improved ramp assembly for mounting upon a trailer used to transport a demountable load on the bed of the trailer. The ramp assembly can also be used, however, on self-propelled, load-carrying vehicles.

Broadly described, the ramp assembly includes a pair of elongated, substantially parallel rigid support plates or ramp plates. In one embodiment of the invention, a third such support plate can beneficially be located between these two. At a forward end of each of the ramp plates, a retaining means in the form of a transversely extending retaining flange is secured to the lower side of the respective ramp plate. Along the length of each of the ramp plates, a plurality of rollers are preferably provided. These facilitate the rolling movement of the respective ramp plate on an elongated track means carried on the trailer. The track means is constructed to rollingly receive each ramp plate, and is adapted to be mounted upon a vehicle, such as a trailer, upon which cargo or a load is to be loaded by means of the ramp assembly.

Disposed at the rear end of the elongated track means is an arresting cam assembly. The arresting cam assembly includes a transverse elongated rod which carries a plurality of horizontally spaced cam plates along its length. Each cam plate carries a convexly-surfaced lobe and a cusp. The cam plates are rotated when the rod is rotated so as to bring the lobes into engagement with the underside of the spaced ramp plates at a time when the ramp plates are in their stored transport position. When the cam lobes force the ramp plates upwardly, they are thereby caused to be tightly engaged with the upper side of the track means in which they are mounted, and thus they cannot vibrate to a loosened or displaced position from which they may be lost. When the cam rod is rotated to a second position used for loading the trailer, the cam lobes are released from contact with the underside of the ramp plates and are rotated to a position where the cusps on each of the cam plates projects vertically at a location to be in the path of, and to arrest rearward movement of the ramp plates after the ramp plates reach their extended, ground engaging position.

GENERAL DESCRIPTION OF THE DRAWINGS

FIG. 1 is a top plan view of a trailer having mounted thereon, a preferred embodiment of the ramp assembly of the present invention.

FIG. 2 is a side elevation view of the rear portion of the trailer showing portions of the ramp assembly of the present invention in elevation.

FIG. 3 is a side elevation view of a portion of the ramp assembly of the present invention, illustrating the ramp assembly when it is in the extended operative position.

FIG. 4 is a sectional view taken along line 4—4 of FIG. 1.

FIG. 5 is a sectional view similar to that shown in FIG. 4 but illustrating one of the ramp plates in its extended, operative position.

FIG. 6 is a rear elevation view of the trailer shown in FIG. 1 and having the ramp plates forming a part of the ramp assemblies of the invention removed from this illustration for purposes of greater clarity and understanding of the structure of the invention.

FIG. 7 is a side elevation view of one of the cam plates in the position it occupies when it permits the ramp assembly to be pulled out to a loading position.

DETAILED DESCRIPTION OF THE PREFERRED EMBODIMENT OF THE INVENTION

Referring initially to FIG. 1 of the drawings, shown therein is a trailer 10 upon which is mounted one of the embodiments of the ramp assembly of the invention. The trailer 10 includes a bed 12 having a towing tongue 4 at the forward side thereof to facilitate towing the trailer behind a towing vehicle. It should be understood, however, that though the present invention is described in the context of a trailer of the type adapted for towing behind a towing vehicle, the invention can also be incorporated in a self-propelled vehicle used for transporting a heavy load which is loaded on the vehicle by the use of the ramp assembly of the present invention.

The type of trailer illustrated further includes a pair of fender wells or guards, designated generally by references numerals 14 and 16, which protectively shield a pair of ground-engaging wheels 18 and 20. The bed 12 of the trailer 10 is made up of suitable planking or plates secured to the upper side of a plurality of a longitudinally extending chassis beams.

In the illustrated embodiment, there are a pair of longitudinally extending chassis beams 22 disposed at opposite sides of the trailer, and a pair of internal, longitudinally extending parallel beams 24 and 26 disposed in horizontally spaced, internally located positions. The chassis beams 22, 24 and 26 are preferably I-beams which extend parallel to each other, and which have opposed, lower horizontal flanges which cooperate to form tracks. Thus, the flanges 30 and 32 of chassis I-beams 22 and 24 form a pair of opposed, horizontally-spaced tracks upon which an elongated ramp plate subassembly can be rollably mounted in a manner hereinafter described. Similarly, the flanges 32 and 34 of chassis I-beams 24 and 26 cooperate to form another pair of tracks for rollably supporting a second ramp plate. The same rollable support function is provided by the cooperation of the flanges 34 and 36, all as shown in FIG. 6 of the drawings.

In the illustrated embodiment of the present invention, the ramp assembly of the invention includes three separate parallel-extending ramp plate subassemblies, 40, 42 and 44. These ramp plate subassemblies are depicted in the drawings, and are substantially identical to each other in construction. Each ramp plate subassembly includes an elongated, generally rectangularly-shaped ramp plate 46 which is secured at its opposite side edges to a pair of opposed, parallel channel members 48. Each of the channel members 48 is of C-shaped cross-sectional configuration, and has an upper flange 60 and a lower flange 62. The lower flange 62 is cut away or relieved at several locations to facilitate the mounting on the opposed channel members 48 of a plurality of longitudinally spaced rollers 64, as shown in FIGS. 4 and 5. The rollers 64 are supported in the channel members 48 on suitable axles 66 which mount through longitudinally spaced holes formed through the web portions of each of these channel members 48.

To provide further strength in each ramp plate subassembly, each subassembly includes a plurality of transversely extending, longitudinally spaced reinforcing ribs 68 of triangular cross-section. The reinforcing ribs 68 project across the ramp plate subassembly beneath the ramp plate 46 and afford support to the ramp plate.

At one end of each of each of the ramp plate subassemblies 40, 42 and 44, the respective ramp plate 46 thereof has an oval-shaped hand hole 70. The hand hole 70 permits the respective ramp plate subassembly to be pulled out of its storage position on the lower side of the trailer beneath the bed 12 to its extended, loading position, as is illustrated in the case of the ramp plate 40 depicted in FIG. 5 and the ram plate 44 depicted in FIG. 3. Near the end of the ramp plate subassembly at which the hand hole 70 is located, a transversely extending plate 72 is secured across the subassembly between the opposed parallel channel members 48 of the subassembly. Each plate 72 functions as a plate against which a camming action functioning to lock the respective ramp plate subassembly in position is brought to bear at a time when the ramp plate subassemblies are stored beneath the trailer 10 for transport, or are extended and in use for loading the trailer. This is subsequently explained in greater detail.

At the opposite or forward end of each ramp plate subassembly, the respective ramp plate 46 thereof carries a downwardly depending flange 74 which extends transversely across the subassembly at this end of the ramp plate. This flange 74 functions as a stop to limit the outward and rearward movement of the ramp plate subassembly when the flange contacts an arresting cusp carried on a cam plate as hereinafter explained, and in the manner shown in FIG. 7.

In order to control the movements and fix the positions of the ramp plate subassemblies 40, 42 and 44 as desired, the ramp assembly of the invention includes a cam subassembly 75. The cam subassembly 75 includes an elongated cam rod 76 which extends transversely across the trailer 10 near the rear end of the bed 12 thereof at the location shown in FIGS. 4–6. The cam rod 76 has one of its ends journaled in a suitable bearing sleeve 78, and passes through a second journal bearing 80 to a location where the second end of the cam rod is keyed to an elongated handle or lever arm 82. The elongated lever arm 82 is used to cause the cam rod 76 to rotate about its longitudinal axis, and to thereby cause the concurrent rotation of a plurality of cam plates 84 hereinafter described in greater detail. The lever arm 82, which is hand-actuated during the operation of the ramp assembly, is pivoted during operation of the ramp assembly from the position depicted in FIG. 2 (as the ramp plate subassemblies are stored for transport), to the position depicted in FIG. 3 after the ramp assemblies have been extended outwardly to their ground-engaging positions.

In order to lock the lever arm 82 in the position illustrated in FIG. 2, the lever arm is pivoted past a detent plate 86 which is secured to a mounting plate 88 carried on one side of the chassis beam 22, as illustrated in FIG. 2. To release and pivot the lever arm 82, the free end of the lever arm is pulled outwardly and the lever arm can then be pivoted rearwardly to clear the detent plate 86. A stop lug 91 is also provided to limit the forward pivoting movement of the lever arm 82.

Keyed to the cam rod 76 at transveresly-spaced intervals therealong are a plurality of the cam plates 84, as hereinbefore broadly described. Each cam plate 84 defines a cam lobe surface 90 and a cusp 92.

Operation

The ramp assembly provided for the trailer 10 illustrated in the drawings is of a type which includes three ramp plate subassemblies, 40, 42 and 44. Some particular usages of the principles of the invention may require only two of the ramp plate subassemblies to be employed. In general, where there is a three-wheeled or tricycle-type vehicle to be loaded on the trailer, such as some types of farm tractors which have a central forward wheel, the illustrated three ramp plate subassembly embodiment of the invention will be utilized. Where the vehicle to be loaded on the trailer has only aligned front and rear wheels occupying parallel lines on opposite sides of such vehicle, two of the ramp plate assemblies will suffice.

At the time when a forklift is to be used to place a load on the trailer 10, or when a vehicle such as a farm tractor or other type of relatively small, transportable vehicle is to be loaded on the trailer, each of the ramp plate subassemblies 40, 42 and 44 is pulled out of its storage, over-the-road position beneath the bed 12 of the trailer. This is accomplished by the use of the hand hole 70 provided in each ramp plate 46 which permits the ramp plate to be pulled out to its fully extended position, with the rear end of each ramp plate subassembly lowered into contact with the ground. Such pull-out of the ramp plate subassemblies is carried out after the lever arm 82 is pivoted rearwardly to its released position, as shown in FIG. 3. This causes the cam rod 76 to rotate about its longitudinal axis, and causes the concurrent rotation of the cam plates 84 until, when the lever arm is in its fully rearward position, the cusps 92 extend upwardly as shown in FIG. 7.

As the ramp plate subassemblies are pulled out to the loading position, they are prevented from being completely detached or pulled free of the trailer 10 by the arresting action of the cusps 92 carried on the cam plates 84. Each cusp 92 is positioned on the respective cam plate 84 so that it will come in contact with one of the flanges 74 carried beneath each ramp plate 46 adjacent the forward end thereof. When the flange 74 contacts the cusp 92 on each cam plate 84, further rearward movement of the respective ramp plate assemblies 40, 42 and 44 is prevented. This position of arrest is shown in FIG. 7.

Before the load to be transported is moved up the ramp plate assemblies 40, 42 and 44 onto the bed 12 of the trailer 10, the lever arm 82 is pivoted forwardly, and this rotates the cam plates from the position shown in FIG. 7 to the position shown in FIG. 5. When the cam plates 84 have been rotated to the latching position shown in FIG. 5, the ramp plates are forced upwardly against the underside of the bed 12, and are thus securely locked in position. They therefore will not shift as the load traverses them. It will also be noted that the load of the respective ramp assembly is transmitted along a line which passes directly through the pivotal axis in the center of the cam rod 76. This places less torsional strain on the cam system than would be the case were the load acting along an off-center line passing to one side of the pivotal axis.

After the load has been placed on the bed 12 of trailer 10, the lever arm 82 is again pivoted rearwardly, and the released ramp plate subassemblies 40, 42 and 44 are pushed back into their transport or storage positions. This is again accomplished by use of the hand holes 70 which are used to lift the rear end of each ramp plate subassembly upwardly and then shove or push the subassembly into its stored position beneath the bed 12 of the trailer. The pushing of the ramp plate subassemblies into the stored position is facilitated by the rollers 64 which are mounted on the side flanges 48 secured to the opposite lateral parallel edges of each of the ramp plates 46. The rollers 64 roll along the tracks formed by the lower flanges of the several I-beams 22, 24 and 26, as such are illustrated in FIG. 6.

After the ramp plate subassemblies 40, 42 and 44 have been pushed into their stored positions, as illustrated in FIG. 4, they are locked in this position by rotating the lever arm or handle 82 forwardly through 90° to the position illustrated in FIG. 2. Here the lever arm 82 is locked in the transport position by its engagement between the detent plate 86 and stop lug 90.

After the several ramp plate subassemblies 40, 42 and 44 have been rolled all the way forward in their tracks formed by the flanges of the I-beams 22, 24 and 26, they are locked immovably in their stored positions by pivoting the lever arm 82 forwardly to the locking position illustrated in FIGS. 1 and 2 of the drawings. In this position, the lever arm is locked by its engagement with the detent plate 86 and stop lug 91. When the lever arm 82 is in this position, the cam plates 84 are rotated to the location where the cam lobe surfaces bias the ramp plate subassemblies 40, 42, and 44 upwardly by contact with the respective transversely extending plates 72. By forcing each of the ramp plate subassemblies 40, 42 and 44 upwardly against the under side of the decking forming the bed 12 of the trailer 10, the ramp plates are locked into position against inadvertent loss, or mispositioning resulting from vibrational movement causing them to be moved rearwardly along their tracks.

Although a preferred embodiment of the present invention has been herein described in order to illustrate the principles of the invention, it will be understood that various changes can be made in such illustrated preferred embodiment without departure from such basic principles. Changes and innovations of this type are deemed to be circumscribed by the spirit and scope of the invention, except as the same may be necessarily limited by the appended claims, or reasonable equivalents thereof.

What is claimed is:

1. In combination with a trailer having an elongated, substantially flat, generally horizontally extending bed supported by a pair of wheels, an improved ramp assembly comprising:
    a plurality of elongated tracks mounted on the trailer at a location beneath said bed;
    at least one ramp plate subassembly mounted on a plurality of said tracks for horizontal movement therealong in the direction of movement of said trailer on said wheels between a transport position beneath said bed and a loading position extending rearwardly and downwardly from said bed; and
    a cam assembly mounted at one end of the tracks on said trailer and including:
        an elongated, horizontal cam rod projecting transversely across said tracks;
        bearings supporting the cam rod for rotation about its horizontal longitudinal axis; and
        a plurality of cam plates secured to said cam rod for rotation therewith and spaced axially from each other along the cam rod, at least one of said cam plates being positioned adjacent each of said ramp plate subassemblies, and each of said cam plates including:
            a cam lobe configured and positioned to contact a respective one of said ramp plate subassemblies and to bias it upwardly to a locked position against the underside of said bed in both said loading position and said transport position when said cam rod is rotated about its longitudinal axis to a first position, whereby in said upwardly biased locked position, said respective one of said ramp plate subassemblies contacted by said cam lobe is prevented form moving upwardly or rearwardly by the cooperative engagement of said cam lobe and bed when said respective one of said ramp plate subassemblies is in its locked position; and
            a portion configured and positioned to engage a portion of said respective one ram plate subassembly to limit movement of said respective one ramp plate subassembly in a rearward direction when said cam rod is rotated about its longitudinal axis to a second position.

2. A ramp assembly as defined in claim 1 wherein each of said ramp plate subassemblies comprises:
    a generally rectangular elongated ramp plate;

flanges projecting downwardly from the opposite side edges of said ramp plate;

roller means mounted on said flanges for rollably supporting said ramp plate on said two tracks; and an additional flange extending transversely across an end of said ramp plate in a position to be engaged by said cam plate portion to thereby limit rolling movement of said one ramp plate subassembly in one direction when said cam rod is rotated about its longitudinal axis to said second position.

3. A ramp assembly as defined in claim 1 and further characterized as including:

a lever arm having one end secured to one end of said elongated cam rod and pivotable from a first locking position to a second position to cause said elongated cam rod to undergo rotation about its longitudinal axis;

a mounting plate adapted for securement on said trailer; and a detent plate secured to and projecting from, said mounting plate and positioned to engage said lever arm when said lever arm is in said first locking position.

4. A ramp assembly as defined in claim 1 wherein said ramp assembly is further characterized as including parallel I-beams mounted on said trailer, and having horizontally extending flanges forming said tracks.

5. A ramp assembly as defined in claim 1 where each of said ramp plate subassemblies comprises:

a flat, elongated ramp plate;

rollers connected to said ramp plate for rollably supporting said ramp plate on said trailer for horizontal movement therealong; and a transversely extending, downwardly projecting flange secured across the under side of said ramp plate in a position to be engaged by said movement limiting portion of said cam plate when said cam plate rod is rotated about its longitudinal axis to said second position.

6. A ramp assembly as defined in claim 1 and further characterized as including means located adjacent, and connected to, one end of said cam rod for selectively controlling the movement of said rod and the cam plates secured thereto, and for locking said cam rod into said second position.

7. A ramp assembly as defined in claim 2 wherein said roller means comprises a plurality of pairs of transversely aligned rollers mounted on said flanges, with the rollers in each pair of rollers mounted on opposite sides of said ramp plate and in transverse alignment with each other.

8. A ramp assembly as defined in claim 2 and further characterized as including a plurality of spaced, reenforcing ribs extending transversely across each of ramp plates on the lower side thereof.

9. A ramp assembly as defined in claim 2 and further characterized as including:

a lever arm having one end secured to one end of said elongated cam rod and pivotable from a first locking position to a second locking position to cause said elongated cam rod to undergo rotation about its longitudinal axis; and a mounting plate adapted for securement on said trailer; and a detent plate secured to, and projecting from, said mounting plate and positioned to engage said lever arm when said lever arm is in said first locking position.

10. A ramp assembly as defined in claim 2 wherein said ramp assembly is further characterized as including I-beams mounted on said trailer and each having a web portion and a pair of opposed, parallel flanges lying in horizontal planes, the lower flanges of each adjacent pair of parallel I-beams forming said tracks.

11. A ramp assembly as defined in claim 2 and further characterized as including means located adjacent, and connected to, one end of said cam rod for selectively controlling the rotational movement of said cam rod, and the rotational movement of the cam plates secured thereto, and for locking said cam rod in said second position.

12. A ramp assembly as defined in claim 7 and further characterized as including:

a lever arm having one end secured to one end of said elongated cam rod and pivotable from a first latching position to a second position to cause said elongated cam rod to undergo rotation about its longitudinal axis;

a mounting plate adapted for securement on said trailer; and a detent plate secured to, and projecting from, said mounting plate, and positioned to engage said lever arm when said lever arm is in said first latching position.

13. A ramp assembly as defined in claim 8 and further characterized as including:

a lever arm having one end secured to one end of said elongated cam rod and pivotable from a first latching position to a second position to cause said elongated cam rod to undergo rotation about its longitudinal axis; and a mounting plate adapted for securement on said trailer; and a detent plate secured to, and projecting from, said mounting plate and positioned to engage said lever arm when said lever arm is in said first latching position.

14. A ramp assembly as defined in claim 9 wherein said ramp assembly is further characterized as including a plurality of parallel extending beams mounted on said trailer and extending from the forward end of said trailer toward the rear end of said trailer, said beams forming said tracks.

15. A ramp assembly as defined in claim 14 and further characterized as including a plurality of spaced ribs extending transversely across each of said ramp plates on the lower side thereof.

16. In a wheeled trailer having a forward side, a rear side and a pair of lateral sides, and having ground engaging wheels mounted along the opposed lateral sides, the improvement which comprises:

chassis I-beams extending parallel to each other, and including horizontal flanges forming two pairs of parallel tracks extending substantially parallel to the direction of travel of said trailer;

a bed secured to and overlying said chassis I-beams;

a ramp plate positioned over each of said pairs of tracks;

rollers rollably supporting each ramp plate upon the respective pair of tracks over which the respective ramp plate is positioned for rolling movement therealong toward and away from the forward side of said trailer between a transport position beneath said bed and a loading position extending rearwardly and downwardly from said bed; and cam means for locking said ramp plates against movement along the pairs of tracks located therebelow, said cam means including:

a cam plate positioned in alignment with each of said ramp plates, said cam plate carrying thereon:

means for limiting the rearward movement of the respective ramp plate to prevent the forward ends of said forward ramp plates from being pulled away from the respective track pairs which rollably support the respective ramp plates; and a cam lobe configured and positioned to bear against a respective one of the ramp plates, and to bias said respective one ram plate into movement arresting engagement with the underside of said bed in both said loading position and said transport position; and means for rotating said cam plates to selectively engage said rearward movement limiting means with said respective ramp plate, or, alternately, said cam lobe with said respective ramp plate.

17. The improvement in a wheeled trailer defined in claim 16 wherein said means for rotating said cam plates comprises:

a cam rod projecting through said cam plates and having said cam plates spaced therealong; and a handle connected to one end of said cam rod to rotate said cam rod about its longitudinal axis when said handle is pivoted about its point of connection to said cam rod.

18. The improvement defined in claim 16 wherein each of said cam plates includes a cam lobe configured and positioned to bear against a respective one of said ramp plates, and to bias said respective one ramp plate into movement arresting engagement with said bed.

19. A ramp loading trailer comprising:

a chassis having a forward end and a rear end, and including a plurality of parallel, elongated chassis beams extending fore and aft between the forward and the rear end of the chassis;

a trailer bed mounted on the upper side of said chassis beams;

a plurality of ramp plate supporting flanges disposed below said bed;

a pair of spaced, parallel, elongated ramp plates movably supported on said flanges for movement from a transport position beneath said bed to a loading position extending rearwardly and downwardly from said bed; and a cam assembly mounted on said chassis beams extending transversely across said chassis and substantially normal to the longitudinal axis of said elongated chassis beams, said cam assembly including:

an elongated cam rod projecting normal to said chassis beams and rotatably supported thereon for rotation about its longitudinal axis; and a plurality of cam plates mounted on said cam rod and spaced axially therealong from each other, one of said cam plates being disposed beneath each of said ramp plates, and each of said cam plates including:

a cusp configured to engage, and resist further rearward movement of, the respective ramp plate located thereabove after the respective ramp plate has been extended rearwardly t its loading position; and a cam lobe surface configured to engage said respective ramp plate located thereabove, and to bias the respective ramp plate into contact with the underside of said bed, and thus prevent movement of said overlying respective ramp plate forwardly or rearwardly in both said loading position and said transport position.

* * * * *

UNITED STATES PATENT AND TRADEMARK OFFICE
CERTIFICATE OF CORRECTION

PATENT NO. : 4,850,788
DATED : July 25, 1989
INVENTOR(S) : Wayne E. Dickson

It is certified that error appears in the above-identified patent and that said Letters Patent is hereby corrected as shown below:

In the Specification:
In Column 3, line 56, delete "ram" and insert -ramp-.

In the Claims:
In Column 6, line 61, delete "ram" and insert -ramp-.
In Column 9, line 13, delete "ram" and insert -ramp-.
In Column 9, line 33, delete "respective one".
In Column 9, line 34, after "into" delete "movement arresting engagement with" and insert -a locked status against a portion of-.
In Column 10, line 28, delete "t" and insert -to-.

Signed and Sealed this

Fifth Day of June, 1990

Attest:

HARRY F. MANBECK, JR.

*Attesting Officer*     *Commissioner of Patents and Trademarks*